Feb. 24, 1931.                P. O. VANDEVEER                1,793,655
                                  PLUG VALVE
                              Filed June 19, 1929
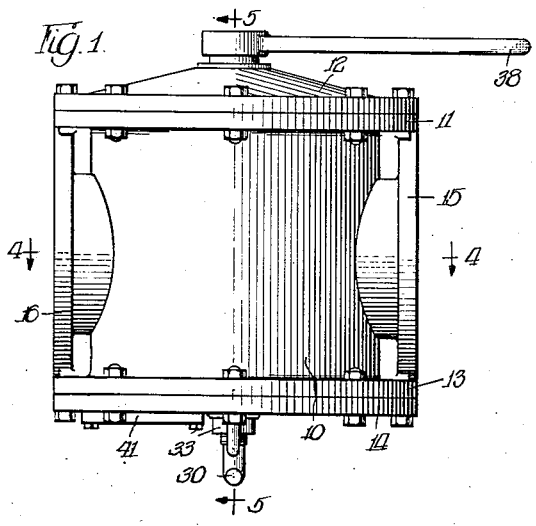
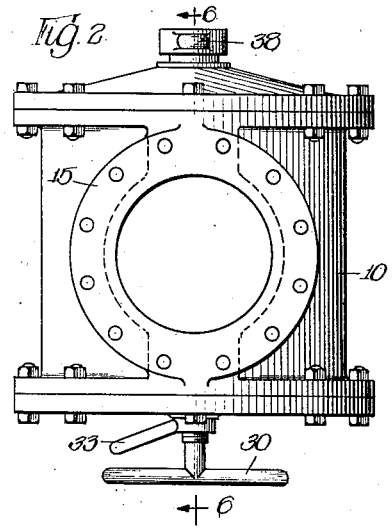
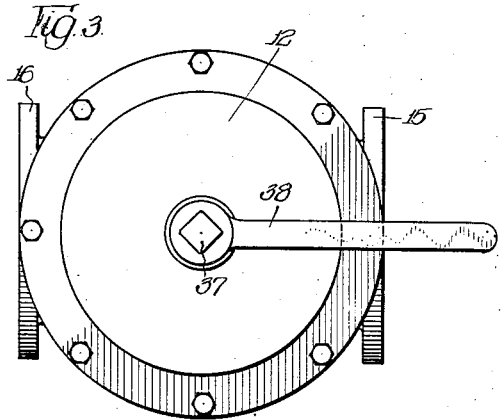
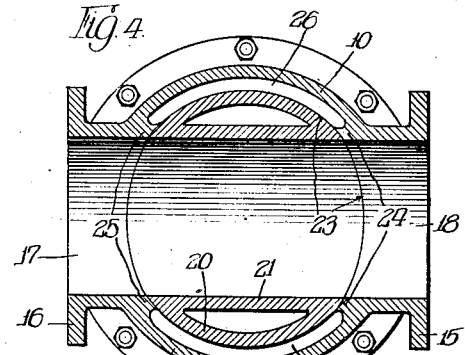
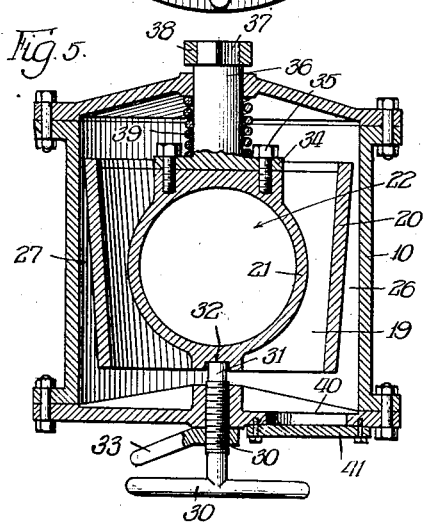
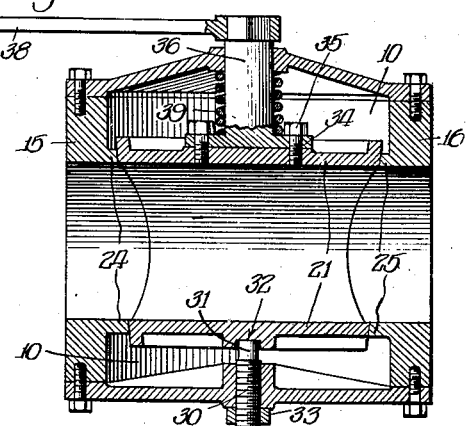
Inventor
Perry O. Vandeveer
By Bruce K. Brown  atty Patented Feb. 24, 1931

1,793,655

UNITED STATES PATENT OFFICE

PERRY O. VANDEVEER, OF WHITING, INDIANA, ASSIGNOR TO STANDARD OIL COMPANY, OF CHICAGO, ILLINOIS, A CORPORATION OF INDIANA

PLUG VALVE

Application filed June 19, 1929. Serial No. 372,047.

The present invention relates generally to valves, and in particular to block valves, of a type which are adapted to be operated without lubricants, and without danger of sticking or jamming, either from lack of lubricant or because of the character of material passing through the valve.

It is often desirable to transport through pipe lines materials which prevent the lubrication of valves placed in the lines, such materials being exemplified by caustic soda solutions, fluid solvents such as gasoline, grains, starch, or dusts, such as powdered coal. It is frequently necessary to shut off such lines by a valve which is effective and dependable for the purpose and which will operate without danger of sticking or jamming. Considerable difficulty has been experienced in using valves for these materials heretofore.

This is especially true in feeding powdered coal to a furnace. A large conduit, say 10 inches in diameter, may be provided for supplying a mixture of air and powdered coal from a mill to a furnace. The mixture usually comprises about equal parts by weight of air and coal, and may be highly explosive under certain conditions of operation. So long as the system is closed and in operation there is little danger of firing the charge, but when there is a shut-down or when the system is opened, a fire-back from the combustion chamber may ignite the mixture, and serious damage may result from the ensuing explosion or combustion which may occur. Therefore, it is highly desirable that a block valve be placed in the line, which is effective and dependable, and which is not hampered in its operation by an accumulation of dust or other solid particles in any part of the valve.

The valves that have heretofore been tried for this purpose have not been found suitable. The dust tends to accumulate on the frictional or seating surfaces, and may become pocketed and cause jamming of the valve. Lubrication is out of the question. Consequently, the best practice has been to block the coal lines with a blind gasket at a pipe joint, an expensive and troublesome procedure.

The present invention provides a valve which is positively operable without lubrication, and dependable against sticking or jamming, which is simple in character and economic in cost of manufacture, and which is particularly adapted to powdered coal feed lines.

A particular object of the invention is to provide a minimum seating or contact surface for the valve parts, and a minimum of opportunity for the collection of material that may cause jamming of the valve.

Another object is to provide a mounting for the valve member in such a manner that the support of the valve member is independent of the seat.

Another object is to provide a valve with dead space within the casing in which dust or other debris may collect without interfering with the operation of the valve.

Still another object is to provide an adjustably and yieldingly mounted valve member.

A specific object of the invention is the provision of a valve in which the usual continuous seating surface is reduced to a minimum, and, in effect, to the surfaces of two ribs or flanges at the points where it is essential to provide a closing seat in the valve. In this manner, edges are provided which operate with a shearing action on opening and closing the valve, thus tending to keep the seating surfaces clean and free from accumulations.

Various other objects and advantages of the invention will become apparent from the following description of an exemplary embodiment of the invention as shown in the accompanying drawings in which:

Fig. 1 represents a side view of a valve adapted for use in a powdered coal line.

Fig. 2 is an end view of the valve from the right of Fig. 1.

Fig. 3 is a plan view of the valve.

Fig. 4 is a horizontal cross section of the valve as viewed from the line 4—4 of Fig. 1.

Fig. 5 is a vertical cross section of the valve as viewed from the right on line 5—5 of Fig. 1.

Fig. 6 is a vertical cross section of the valve as viewed from the right of Fig. 2 on line 6—6 thereof.

Although I have illustrated the invention by reference to a valve specifically adapted for coal dust lines, it is to be understood that various modifications and changes may be made in the structure of the valve for the same use, or for other uses with other materials, and that such changes and uses are clearly comprehended as falling within the scope of the invention as defined by the appended claims.

Generally the valve illustrated in the drawings comprises a casing and plug valve member, and, when the valve is open, it provides a tubular opening adapted to form an unobstructed continuation of the passage way in flanged pipes that may be connected to the valve casing. The casing contains a rotary plug in which a tubular opening is formed, the plug being sufficiently large to provide closing areas to cover the tubular opening through the valve. The seat for the plug is cut-away, or rather is lacking in the construction of the casing, except for a minimum of seating surface that is provided in the vicinity of the line of intersection of the plug and the tubular passageway in the casing. A tapered plug is preferably employed, and is adjustably and yieldingly supported by means independent of the seat to prevent wedging of the parts together.

In detail, there is a casing 10, such as an iron casting, having flanged surfaces, including a top 11, for a cover plate 12 and a bottom 13 for a bottom plate 14, and opposing flanged sides 15 and 16 for pipes (not shown) leading to the valve. The sides 15 and 16 are shown with alined cylindrical passages 17 and 18, respectively, corresponding in size and shape to the passage in the pipes employed.

The casing has a crossing bore or opening which intersects the line of the passages 17 and 18, and which is adapted to receive a rotary plug valve member 19, which is preferably tapered in a conical form. The plug member is illustrated as a frusto-conical member having a conical wall 20 across which a cylindrical member 21 is formed integrally, providing a cylindrical opening 22 adapted to register with the aligned openings 17 and 18. The conical surface 23 of the valve member registers with the cross bore in the casing 10 at the surfaces of ribs or flanges 24 and 25, which are illustrated with one side being formed continuously with the walls of the casing inlet and outlet 17 and 18. These ribs follow generally the lines of intersection of the plug and the passage way through the valve. Spaces 26 and 27 are thus formed between the plug wall 20 and the casing wall 10. These spaces communicate freely with the remainder of the space within the casing 10, so that when the valve is in an intermediate position, as in the process of operation, there is communication from the pipe line to the interior of the valve casing. It will be noted that the spaces indicated at 26 and 27 are in effect a cut-away portion of a conical seat which would otherwise be provided by continuation or widening of ribs 24 and 25 until they merge. Such a merging construction would form a common type of seating from which it is aimed to depart in the present invention.

The minimum of surface or contact area offered by the ribs 24 and 25 limits the possibility of sticking or freezing of the parts, and lowers the frictional area. This is important where lubricant is not or cannot be employed.

In order further to limit the sticking, or frictional areas, the conical plug is supported so that it cannot be wedged into the registering seat provided by the two opposing flanges 24 and 25. The support is made adjustable so as to raise the valve member when desirable to control or adjust the fitting of the parts, or to permit grinding or regrinding of the contact or seat areas, in case they have become injured or worn in use. The plug member is preferably yieldingly mounted against said support by yieldable thrusting means acting in addition to or to overcome the weight of the plug member, according to the position of the valve.

A suitable construction employed for mounting the valve member may comprise a hand screw 30 in the bottom plate 14 of the valve, axially of the plug, to act as a pivot for the valve member. It has a bearing end 31 fitting into a socket 32 in the plug. A hand operated lock nut 33 is mounted on the hand screw 30. The top of the plug carries a plate 34, bolted to the plug at 35 from which an integral axial valve stem 36 projects through the top plate 12. The end of the stem 36 is squared to form a nut-like end 37 for receiving a suitable operating handle 38. The fitting of the stem 36 and its bearing in the plate 12 may be made as tight as necessity may require for a particular use of the valve, and it may be packed if liquids are employed. A compression spring 39 is shown acting between the cover plate and the valve member to hold the plug against the adjustable screw which acts as the pivotal support.

It will be apparent that in the operation of this valve, any solid material which collects on the seating surfaces will be sheared off by the extending edges provided by the narrow construction of the seating surfaces. Such solid material may then be free to fall into the dead space (26 and 27 in the drawing) provided for that purpose in the valve casing where it cannot interfere with the moving parts of the valve to cause sticking or jamming.

Since the space within the valve may be temporarily in communication with the line passage during opening of the valve, the casing may tend to accumulate dust, or may become filled with a liquid according to the use of the valve. Should there be an excessive accumulation of sediment or dust, it may interfere with the free working of the valve and necessitate cleaning. For this purpose the top or bottom plate may be removed to clean out the casing, but I prefer to provide the casing with a clean out opening, so that when the valve is turned to open position, the casing may be cleaned without interfering with the passage of material through it. An opening 40 is therefore provided in the bottom plate 14 and is closed by a cover plate 41.

Although I have shown the valve casing as the part which is provided with the ribs or flanges that form the seat, and a plug member with an unbroken conical form, it will be readily understood that the plug member may carry the ribs, and that the casing may have a conical seat, in which case, of course, an additional transverse fin would be required for closing the passage. It is to be understood that the relation is relative, and that the ribs may be placed differently without departing from the spirit and scope of the invention.

It is further to be noted that by providing an independent support for the plug member I eliminate the frictional contact and pressure between the seating surfaces, whereby lubrication may be dispensed with. The structure described may induce wear at the end of the support 30, but since it is adjustable, the wear may be easily compensated for by turning the support to enter the casing a proper amount. I may, therefore, employ the supported plug member in a valve wherein the seat is not cut away as herein described, and thereby secure the advantages of a valve which is operable without lubrication. However, where the valve is designed for use with dust, such as coal, it is important to use the cut-away seat structure, to prevent the accumulation of dust or particles in the interfacial space that would otherwise exist.

Although I have shown the valve fitted with a tapered plug, it will be readily understood that the novel features of my invention can also be applied to a valve using a plain cylindrical plug.

I claim:

1. A valve comprising in combination, a casing having a continuous passageway therethrough and an opening intersecting said passageway, a conical rotary plug valve member in said opening having a passageway therethrough for registering with said continuous passageway in said casing, said casing having lips about the edges of the casing passageway to provide valve seats conforming to said plug, said casing having a clean-out opening through a lower portion thereof, means normally covering said clean-out opening, and means for supporting said plug against wedging against said seats.

2. A plug valve comprising a casing having a continuous passageway therethrough and a bore for a plug member intersecting said passageway, a tapered plug rotatably mounted in said bore and having a passageway transverse its axis of rotation for registration with said casing passageway in one position, means providing a valve seat at one side of said plug adjacent the intersection of said passageway and bore and spacing said plug from said casing over a distance between said means and the opposite side of said plug whereby to provide a space between said plug and the casing wall, said casing having a bottom portion below and spaced from the lower end of the plug whereby to provide a space communicating with the first said space for reception of debris therefrom, said casing bottom having an opening therethrough, and removable means for closing said opening.

3. A plug valve comprising a casing having a continuous passageway therethrough and a bore for a plug member intersecting said passageway, a tapered plug rotatably mounted in said bore and having a passageway transverse its axis of rotation for registration with said casing passageway in one position, means providing a valve seat at one side of said plug adjacent the intersection of said passageway and bore and spacing said plug from said casing over a distance between said means and the opposite side of said plug whereby to provide a space between said plug and the casing wall, said casing having a bottom portion below and spaced from the lower end of the plug whereby to provide a space communicating with the first said space for reception of debris therefrom, said casing bottom having an opening therethrough, a cover for the top of said casing, a spring between said cover and the top of said plug normally urging said plug against said seats, and means for adjusting the frictional contact between the plug and its seats against the action of said spring.

4. In a valve of the character described, a substantially cylindrical casing having inlet and outlet ports opening into the interior thereof, a continuous internally projecting lip about each of the port openings, an externally tapered plug rotatably disposed in said casing with its axis substantially parallel the axis of the casing and seating on said lips, said plug having a transverse passageway therethrough adapted to register with said ports upon rotation of the plug to a predetermined position, a cover for the bottom of said casing spaced below the bottom of said plug, a cover for the top of said casing and means for rotating said plug.

5. In a valve of the character described, a substantially cylindrical casing, inlet and outlet port nipples connected to the cylindrical wall of said casing and opening into the interior thereof, a continuous internally projecting lip about each of the port openings, a tapered plug rotatably disposed in said casing with its axis substantially parallel the axis of the casing and seating on said lips, said plug having a passageway therethrough adapted to register with said ports upon rotation of the plug to a predetermined position, a cover for the bottom of said casing removably secured thereto and spaced below the bottom of said plug, a cover for the top of said casing, and means for rotating said plug.

6. In a valve of the character described, a substantially cylindrical casing, said casing being provided with outward flanged portions at its opposite ends, inlet and outlet port nipples connected to the cylindrical wall of said casing and opening into the interior thereof, a continuous internally projecting lip about each of the port openings, a tapered plug rotatably disposed in said casing with its axis substantially parallel the axis of the casing and seating on said lips, said plug having a passageway therethrough adapted to register with said ports upon rotation of the plug to a predetermined position, a cover for the bottom of said casing removably secured to said flanges thereof and spaced below the bottom of said plug, a cover for the top of said casing removably secured to the flanges thereof, a valve stem passing through the top cover whereby said plug may be rotated, a spring disposed between said top cover and said plug and normally urging said plug against its seats, and means for adjusting the frictional contact between said plug and its seats against the action of said spring.

This specification signed this 12th day of June, 1929 at Whiting, Indiana.

PERRY O. VANDEVEER.